(12) United States Patent
Pyndiah et al.

(10) Patent No.: US 8,510,640 B2
(45) Date of Patent: Aug. 13, 2013

(54) METHOD FOR TRANSMITTING A DIGITAL SIGNAL BETWEEN AT LEAST TWO TRANSMITTERS AND AT LEAST ONE RECEIVER, USING AT LEAST ONE RELAY, AND CORRESPONDING PROGRAM PRODUCT AND RELAY DEVICE

(75) Inventors: Ramesh Pyndiah, Plouzane (FR); Andrzej Kabat, Brest (FR); Karine Amis, Locmaria Plouzane (FR); Frederic Guilloud, Locmaria Plouzane (FR)

(73) Assignee: France Telecom, Paris (FR)

( * ) Notice: Subject to any disclaimer, the term of this patent is extended or adjusted under 35 U.S.C. 154(b) by 183 days.

(21) Appl. No.: 12/935,184

(22) PCT Filed: Mar. 31, 2009

(86) PCT No.: PCT/EP2009/053816
§ 371 (c)(1),
(2), (4) Date: Mar. 18, 2011

(87) PCT Pub. No.: WO2009/121883
PCT Pub. Date: Oct. 8, 2009

(65) Prior Publication Data
US 2011/0161785 A1 Jun. 30, 2011

(30) Foreign Application Priority Data
Apr. 2, 2008 (FR) ...................................... 08 52190

(51) Int. Cl.
*H03M 13/00* (2006.01)
(52) U.S. Cl.
USPC ........................................................ 714/776

(58) Field of Classification Search
None
See application file for complete search history.

(56) References Cited

PUBLICATIONS

Valenti M.C. et al., "Distributed Turbo Codes: Towards the Capacity of the Relay Channel" Vehicular Technology Conference, 2003—VTC 2003—Fall—2003 IEEE 58th Orlando—USA—Oct. 6-9, 2003, Vehicular Technology Conference, Piscataway, N J, USA, IEEE, US—vol. 1, pp. 322-326, Oct. 10-6, 2003.*
Lo E. S. et al., "Cooperative Concatenated Coding for Wireless Systems" Communications, 2007—ICC '07—IEEE International Journal Conference on, IEEE, PI, pp. 6097-6102, Jun. 1, 2007.*

(Continued)

*Primary Examiner* — John Trimmings
(74) *Attorney, Agent, or Firm* — David D. Brush; Westman, Champlin & Kelly, P.A.

(57) ABSTRACT

A method is provided for transmitting a digital signal between at least two transmitters and at least one receiver, using a concatenation of at least two codes. The method includes a first encoding step, in the transmitters, which outputs at least two first code words; a first transmission step of the first code words, via at least two distinct transmission channels; a receiving step, in at least one relay device, of at least two of the first code words, known as intermediate code words; a step of intertwining at least one part of the bits of the intermediate code words that outputs the intertwined bits; a second step of encoding the intertwined bits, in the relay(s), which outputs at least one second code word, taking into consideration the intermediate code words; a second step of transmitting the second code word(s) through the relay device(s), so as to enable, in the receiver(s), an iterative decoding, taking into account the first code words, and then a redundancy formed by the second code word(s).

15 Claims, 6 Drawing Sheets

(56) References Cited

PUBLICATIONS

Valenti M.C. et al., "Distributed Turbo Codes: Towards the Capacity of the Relay Channel" Vehicular Technology Conference, 2003—VTC 2003—Fall—2003 IEEE 58th Orlando—USA—Oct. 6-9, 2003, Vehicular Technology Conference, Piscataway, NJ, USA, IEEE, US—vol. 1, pp. 322-326, Oct. 10-6, 2003.

Li et al., "Distributed Turbo Coding with Soft Information Relaying in Multihop Relay Networks" IEEE Journal on Selected Areas in Communications, IEEE Service Center, Piscataway, US, vol. 24, No. 11, pp. 2004-2050, Nov. 1, 2006.

Hong Wen et al., "Cooperative Coding Using Parallel Concatenated LDPC Codes" Information Theory Workshop 2006—ITW '06 Chengdu, IEEE, PI, pp. 395-398, Oct. 1, 2006.

French Search Report dated Feb. 18, 2009 for corresponding French Application No. FR0852190, filed Apr. 2, 2008.

International Search Report dated Mar. 15, 2010 for corresponding International Application No. PCT/EP2009/053816, filed Mar. 31, 2009.

Yang et al., "Network Coding Over a Noisy Relay: a Belief Propagation Approach" Proc. IEEE ISIT '07, Nice, France, Jun. 2007.

Zhang et al., "Joint Design of Network Coding and Channel Decoding for Wireless Networks" Proc. IEEE WCNC '07, pp. 779-784, Mar. 11-15, 2007.

Berrou et al., "Near Shannon Limit Error-Correcting Coding and Decoding: Turbo-Codes (1)" IEEE International conference on Communication—ICC '93, pp. 1064-1071, vol. 2/3, May 1993.

P. Elias, "Error-Free Coding" IRE Trans. on Inf. Theory, pp. 29-37, vol. IT 4, Sep. 1954.

\* cited by examiner

METHOD FOR TRANSMITTING A DIGITAL SIGNAL BETWEEN AT LEAST TWO TRANSMITTERS AND AT LEAST ONE RECEIVER, USING AT LEAST ONE RELAY, AND CORRESPONDING PROGRAM PRODUCT AND RELAY DEVICE

CROSS-REFERENCE TO RELATED APPLICATIONS

This Application is a Section 371 National Stage Application of International Application No. PCT/EP2009/053816, filed Mar. 31, 2009 and published as WO 2009/121883 on Oct. 8, 2009, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to the transmission of encoded data from at least two transmitters to at least one receiver. More specifically, the disclosure pertains to improving the quality of the transmission of such data and especially of error-correction decoding performance in a receiver.

The disclosure can be applied especially but not exclusively to the transmission of data through wireless or mobile networks, for example for real-time applications.

BACKGROUND OF THE DISCLOSURE

These wireless or mobile networks are searching for significant gains in terms of capacity, reliability, consumption and the like. Unlike in a landline network, the transmission channel of a wireless network or mobile network is reputed to be difficult and leads to relatively mediocre reliability of transmission. Major progress has been made in recent years in the field of encoding and modulation, especially as regards consumption and capacity. Indeed, in a wireless network where several transmitters/receivers share the same resources (of time, frequency and space), the sending power must be reduced to the utmost.

To make communications reliable, the technique generally used is the ARQ (Automatic Request for Repetition) technique wherein the information is re-transmitted if the receiver detects a presence of errors. This technique calls for error-detection mechanisms and a channel dedicated to signaling. Its main defect is that it increases the transmission time and therefore has little compatibility with real-time applications (telephony for example). Furthermore, new emerging applications such as sensor networks or also the broadcasting of television signals to mobile units are subject towards constraints of complexity and/or consumption that are incompatible with these solutions.

A second and more recent approach relies on relays to improve transmission efficiency. The relay can either "decode and forward" the stream or "amplify and forward" the received signal.

Finally, it has been proposed to combine this technique of relays with the technique known as "network coding". This approach is described for example by S. Yang and R. Koetter, "Network Coding over a Noisy Relay: a Belief Propagation Approach," in Proc. IEEE ISIT '07, Nice, France, June 2007.). The relay decodes the two received code words sent respectively by two sources, and then computes and transmits the log-likelihood ratio (LLR) of the bit-by-bit sum modulo 2 of the two code words. Thus, the receiver has three observations available: the two sources and the LLR. This solution has several defects: it is highly sensitive to errors in the relay and above all the analog value of the LLR must be transmitted with sufficient precision (four bits at least) between the relay and the receiver for each bit of the stream sent by the sources, and this is to the detriment of the capacity of the network. A similar approach is proposed by S. Zhang, Y. Zhu, S.-C. Liew, and K. Ben Letaief, "Joint Design of Network Coding and Channel Decoding for Wireless Networks" in Proc. IEEE WCNC '07, pp. 779-784, 11-15 Mar. 2007). However, the authors have studied the reduction of complexity in the relay without touching on the decoding in the receiver.

In these different cases, the decoding is difficult and there is no simple and efficient solution for processing in the receivers.

SUMMARY

An exemplary embodiment of the invention proposes a method for transmitting a digital signal between at least two transmitters and at least one receiver implementing a concatenation of at least two codes, comprising:
- a first encoding step, in said transmitters, delivering at least two first code words;
- a first step for sending said first code words;
- a step for receiving, in at least one relay device, at least two of said first code words called intermediate code words;
- a step for interleaving at least one part of the bits of said intermediate code words delivering interleaved bits;
- a second step for encoding said interleaved bits, in said relay or relays, delivering at least one second code word taking account of said intermediate code words;
- a second step for sending said second code word or code words by means of said relay device or devices, so as to make it possible, in said receiver or receivers, to carry out an iterative decoding taking account of said first code words and then a redundancy formed by said second code word or code words.

The first sending step can be implemented especially through at least two distinct transmission channels so as to increase the diversity. These channels may be distinct for example, owing to the fact that the transmitters are distinct, that at least one of said at least two transmitters implements several sending antennas, that the relay implements several receiver antennas or also that said at least two transmitters and/or the relay comprise means to obtain variation in the transmission channel in the course of time (for example means for applying a variable delay).

Thus, an embodiment of the invention relies especially on the introduction of an interleaving and an encoding in the relay device or devices, enabling all the dispersed transmitters to benefit from the encoding gain of a turbo-code. The encoding can be especially a bit-by-bit combination of at least two of the intermediate code words received by the relay. Indeed, the approach of an embodiment of the invention enables the implementing in the receivers of an iterative decoding relying on a redundancy generated in the relays without necessitating the implementation of the turbo-encoding in the transmitters.

This approach also reduces encoding delays as compared with a classic turbo-encoding operation which would be implemented in each transmitter and which would be incompatible with real-time applications while simplifying the processing and the complexity of these transmitters.

In other words, an embodiment of the invention relies on a novel approach, proposing a network distribution of the error-correction code or of the turbo-encoding.

Many alternative embodiments of implementation can be envisaged depending on the type of interleaving, the type of encoding, the number of transmitters and relays (which can be cascaded), the concatenation of the codes (parallel, series or any).

According to a first embodiment, said interleaving step implements a pseudo-random interleaving.

In a second embodiment, this interleaving step implements a row/column matrix of a product code.

In this case, said first code words may include row information bits and row redundancy bits and said second code words form redundancy code words from column redundancy bits, enabling the building of a product code matrix in said receiver or receivers.

Thus, we have a product code in the receiver that may be decoded iteratively, for example using the Chase-Pyndiah algorithm for block codes or any other adapted decoding method for the code considered.

Said first and second sending steps can implement a time division multiple access (TDMA) technique or a frequency division multiple access (FDMA) technique and/or a code division multiple access (CDMA) technique or any other multiple access technique used to separate the different contributions in the receivers.

In a first approach, said step for receiving in the relay implements a hard decision on the value of each of the bits received in the relay to form said intermediate code words.

This approach is simple and fast to implement.

According to a second approach, said step for receiving in one of said relay devices implements a sub-step for thresholding the value of each of the bits received in said relay device, delivering thresholded data, and a sub-step for correcting errors of said thresholded data to form said intermediate code words.

According to a third approach, said step for receiving in one of said relay devices is followed by a step of soft decoding on the soft value of each of the bits received in said relay, to form said intermediate code words.

In this case, said step of soft decoding can especially implement a step of searching for a code word that minimizes the mean square error versus the soft values received.

This gives greater efficiency than the first approach because it reduces the number of errors in the relay.

In at least one embodiment of the invention, the method also comprises a step for assigning, in the relay, a piece of information on reliability to at least one of said bits of said second code words.

It is thus possible to further improve the quality of the decoding by introducing a weighting operation.

Said piece of information on reliability can especially comprises at least one signaling bit indicating the position of at least one low-reliability bit in said second code word.

As already stated, an embodiment of the invention can be implemented with many types of codes. Said first encoding step and/or said second encoding step may implement for example a linear code belonging to the group comprising:
 convolutive codes;
 BCH codes;
 RS codes;
 turbo-codes;
 binary or non-binary LDPC codes;
 parity codes.

In at least one particular embodiment, at least one first relay device receives at least one intermediate code word sent by a second relay device.

In other words, it is possible to cascade relay devices. More generally, it is possible to envisage many arrangements, if necessary variable in time and/or in space, for combining the transmitters and the relays so as to improve the quality of the decoding.

An embodiment of the invention also pertains to a computer program product downloadable from a communications network and/or recorded on a computer-readable carrier and/or executable by a processor, comprising program code instructions for implementing the transmission method described here above.

An embodiment of the invention also pertains to relay devices for implementing this method. Such a method comprises especially:
 means for receiving at least two intermediate code words sent out by at least two transmitter devices and/or at least one other relay device;
 means for interleaving at least one part of the bits of said intermediate code words delivering interleaved bits;
 means for encoding said interleaved bits so as to form at least one second code word taking account of said intermediate code words;
 means for sending said second code word or code words.

BRIEF DESCRIPTION OF THE DRAWINGS

Other features and advantages shall appear from the following description of a particular embodiment, given by way of an illustrative and non-exhaustive example and from the appended drawings, of which.

DETAILED DESCRIPTION OF ILLUSTRATIVE EMBODIMENTS

1. General Points

An embodiment of the invention therefore proposes a novel approach to the use of relay devices (or relays) to improve the quality of the transmission while enabling simple and efficient decoding in the receivers.

To this end, the relay or relays receive the code words (or at least some of them) produced by the transmitters (or at least some of them) and produce at least one additional code word as a function of the code words received. These code words are transmitted to the receiver (or to the receivers) which process all the code words received, from the transmitters and the relay or relays, as a whole, according to an iterative decoding whose approach is known per se.

According to different embodiments, there may be only one or more transmitters with one or more sending antennas. In most cases, the relay or relays (and the receiver or the receivers) may receive code words transmitted through distinct transmission channels.

Each relay device therefore gives redundancy code words which improve the decoding. These redundancy code words are formed by applying an interleaving to the received code words and an encoding of the interleaved bits. In an interesting approach of an embodiment of the invention, the interleaving is obtained by placing the received code words in the rows of a matrix and by encoding the columns of this matrix. The column redundancy bits may then form additional code words which will be decoded in the receivers as the classic product code.

According to this approach, seen from the receiver side, a series concatenation of the codes is performed. It is also possible to carry out a parallel concatenation by not processing the columns corresponding to redundancy bits.

It is also possible to apply any unspecified interleaving, for example a pseudo-random interleaving and if necessary one that is variable in time (a signaling would then have to be planned to inform the receiver of the interleaving implemented).

The received bits are decoded (before or after interleaving) by thresholding or in a hard or soft mode before being subjected to a new encoding. The soft decoding may for example implement a search for the code word that minimizes the mean square error versus the received values. In this case, it is possible to associate a piece of information on trust or reliability with the encoded data. In particular, it may be a signaling bit indicating the position of at least one low-reliability bit in one of the second code words.

Many types of codes can be used in the transmitters and in the relays if they are linear codes. These codes may especially be:

convolutive codes;
BCH codes;
RS codes;
turbo-codes;
binary or non-binary LDPC codes;
parity codes.

It is possible to use the same code in these transmitters and relays or different codes.

A method of multiple access is used to enable the receiver to receive the different code words independently. Here below we consider the implementing of a time division multiple access (TDMA) technique. However, a frequency division multiple access (FDMA) technique or a code division multiple access (CDMA) technique and, as the case may be, their combinations are possible.

2. First Embodiment

2.1 Principle

Figure 1:
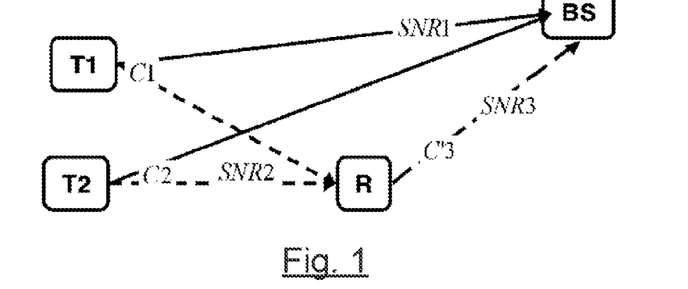
FIG. 1 is a first example of a transmission system implementing the method of an embodiment of the invention.

In the case of a simple transmission system illustrated by FIG. 1, implementing two transmitters T1, T2 one relay R and one receiver BS (in the example implemented, a base station), the relay receives C1 and C2 and delivers the sequence C'3.

The base station therefore has available three code words or sequences C1, C2 and C'3, which it can decode according to an iterative decoding method.

Figure 2:
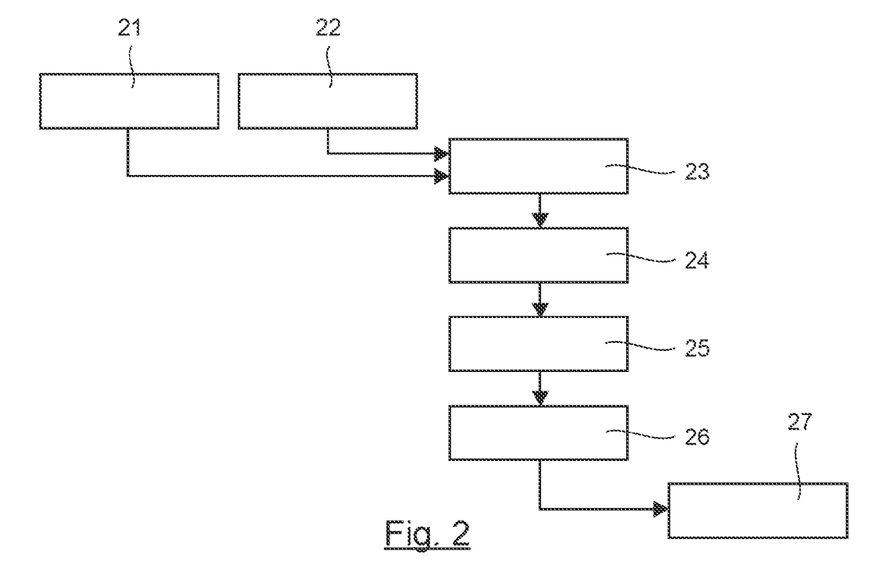
FIG. 2 is a simplified flowchart of the method of transmission implemented in the system of FIG. 1.

The method implemented is illustrated in simplified form in FIG. 2.

Each transmitter sends (21, 22) one code word C1, C2. Depending on the embodiments, it is of course possible to make the transmitters send several code words simultaneously, if necessary at different bit rates and/or variably in time. Again, in this case, an adapted signaling is preferably implemented.

The relay receives (23) these code words and applies a bit-by-bit thresholding of the observations to give C'1 and C'2. It can be noted that C'1 and C'2 are not inevitably the initial code words, possibly because of errors.

These intermediate code words are interleaved (24) and the interleaved pieces of data are encoded (25) to give C'3. As indicated here above, the interleaving 24 can especially consist of an operation of writing in the rows of a matrix and the encoding 25 must be applied to the columns of the matrix.

Figure 3:
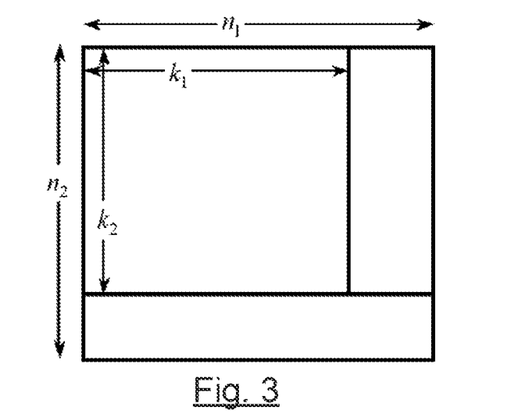
FIG. 3 illustrates a product code obtained by the invention in one particular embodiment.

We then obtain a product code as illustrated in FIG. 3 in a generalized form with n1 columns and n2 rows. It has k2 rows each corresponding to a code word received from the transmitters and each comprising k1 information bits and n1-k1 redundancy or parity row bits.

The n2-k2 remaining rows are redundancy code words, built in the relay and corresponding to column parity bits.

It must be noted that, in this embodiment of building a product code, the encoding 25 may correspond to a bit-by-bit sum modulo 2 of C'1 and C'2 to form C'3.

The relay then transmits (26) the binary sequence C'3 to the base station BS.

Figure 4:
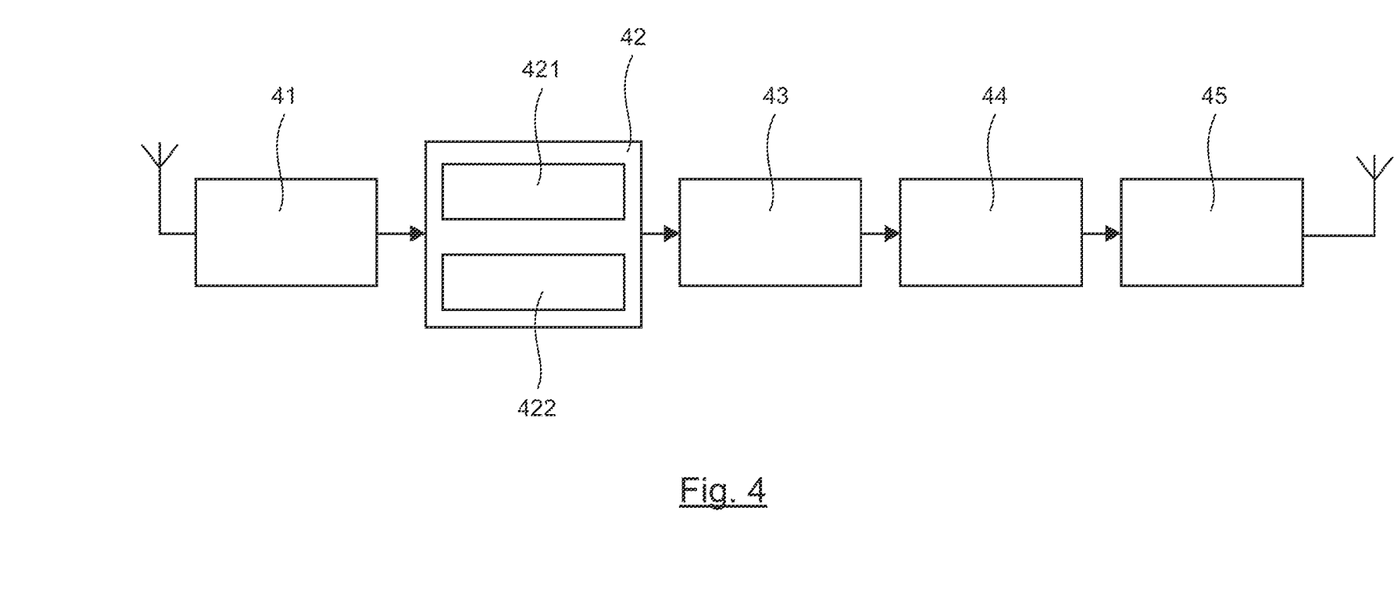
FIG. 4 describes the main resources present in a relay device according to an embodiment of the invention.

The structure of one embodiment of such a relay is illustrated in FIG. 4. It comprises means 41 for receiving code words sent by the transmitters, and means 42 for decoding these code words to restitute decoded bits. The decoding means comprise means of hard decision 421 by thresholding, and if necessary soft decision means 422 associating a value of trust in the hard decision.

An intermediate approach may consist of an error correction on thresholded data (hard decoding) in the relay to form said intermediate code words. If the encoding in the relay is done above the physical layer, then there is no soft decision but the performance versus the thresholding can be improved by a hard decoding operation.

The decoded bits are then interleaved for example row by row in a matrix 43, read column by column. One or more redundancy code words are determined by encoding means 44 associating one or more parity bits with each column.

The redundancy code words thus formed are then sent (45) to the receiver.

This base station BS therefore receives the observations of C1, C2 and C'3. It must decode C1, C2 from the observations of C1, C2 and C'3.

It can be seen that C1, C2 and C'3 form a product code which can be decoded (27) by turbo-decoding as described in detail here below.

2.2 Turbo-Decoding

The turbo-codes presented by C. Berrou and A. Glavieux especially in "Near Shannon limit error-correcting coding and decoding: Turbo-codes (1)," IEEE Int. Conf. on Comm. ICC '93, pp. 1064-1071, vol 2/3, May 1993, rely on the implementation of two recursive systematic convolutional codes concatenated in parallel by means of a non-uniform interleaving. The decoding is for example a soft input soft output (SISO) iterative decoding using extrinsic information.

R. Pyndiah has shown that turbo-codes can be adapted to block codes. This approach consists in concatenating two block codes in series by means of a uniform row/column interleaving. This technique is known as a product code (see P. Elias, "Error-free coding," IRE Trans. on Inf. Theory, pp. 29-37, vol. IT-4, September 1954). The decoding can also implement a soft input soft output (SISO) iterative decoding using for example the Chase-Pyndiah algorithm described in "Near optimum decoding of product codes: block turbo-codes" (IEEE, Trans. on Communications, Vol. 46, no 8, August 1998).

It may be recalled that the implementation of a product code can take the form of a matrix of n1 rows and n2 columns as illustrated by FIG. 3. The product code is then obtained by:
- the encoding of the information bits of the k2 first rows, using a parameter row code (n1, k1, δ1);
- the encoding of the n1 columns using a parameter column code (n2, k2, δ2).

The n2 rows and n1 columns respectively form code words of a code C1, C2 respectively. The parameters of the corresponding product code are (N=n1*n2, K=k1*k2, Δ=δ1*δ2). Such a code has a minimum distance, which is very great. These codes can be all systematic linear block codes such as the BCH codes (as proposed in the article "Near optimum decoding of product codes: block turbo-codes" mentioned here above) and more particularly any combination of linear codes such as convolutional codes, Golay codes, parity codes etc.

The rows and the columns are successively decoded by means of the Chase-Pyndiah algorithm.

In the case of the embodiment of FIG. 1, the two terminals T1 and T2 are deemed to be using the same code (n, k, δ) and the code words are deemed to be transmitted by means of a BSPK (Binary Phase-Shift Keying) modulation in an AWGN (Additive White Gaussian Noise) channel.

The terminal T1 transmits the code word C1 and the terminal T2 transmits the code word C2. The relay R receives the corresponding signals and delivers the estimation C'1 and C'2. This estimation is obtained for example by a thresholding on the log-likelihood ratio (LLR) at output of a demodulator, in the case of hard decisions. It is also possible to carry out an error-correction soft decoding of the LLR values of each code word.

The relay R then makes a bit-by-bit combination of C'1 and C'2 to give the code word C'3 which is transmitted to the base station BS which fulfils the function of a receiver as understood in the claims.

We can write:

$$C'1 = C1 \oplus E1$$

$$C'2 = C2 \oplus E2$$

with E1 and E2 being the errors introduced during the estimation of C1 and C2 into the relay.

C'3 can then be written as:

$$C'3 = C'1 \oplus C'2 = C1 \oplus E1 \oplus C2 \oplus E2 = C3 \oplus E$$

where C3 is a code word obtained by linear combination of C1 and C2 and E is an error corresponding to the linear combination of E1 and E2.

The base station BS then receives three signals respectively corresponding to C1, C2 and C'3. In this base station, according to an embodiment of the invention, these signals will be decoded as a product code. The sequences C1, C2 and C'3 are then placed in a 3*n matrix to respectively form the three rows of these sequences:

$$C1 = (c_1^1, c_2^1, \ldots, c_n^1)$$

$$C2 = (c_1^2, c_2^2, \ldots, c_n^2)$$

$$C3 = (c_1^3, c_2^3, \ldots, c_n^3)$$

This matrix is a product code if the error E is null, i.e. if no error has been introduced by the relay.

Should the error E be non-null, one of said at least two transmitters will send code words with errors. The received matrix may be considered to be a product code word comprising errors introduced by the transmission (of one of said at least two transmitters to a relay and/or from a relay to the base station) to which those introduced into the relay may possibly be added.

In the latter case, the reliability of the bits coming from the relay is not high (false bit with high reliability) and this impairs the performance of the decoder. The block turbo-code has a major advantage in this situation because it is far more robust than the previous schemes (such as the RSC convolutive codes with parallel concatenation). Indeed, an RSC code generates a long sequence of errors for one isolated error at input, unlike the block codes. Furthermore, with parallel concatenation, the redundancy bits do not benefit from the extrinsic information unlike the product codes. During the iterative decoding, the errors generated in the relay can be corrected, thus limiting the deterioration induced.

The rows of this matrix are code words of a block code (n, k, δ) and the columns are code words of a parity code (3, 2, 2). This product code can therefore be decoded iteratively according to the Chase-Pyndiah algorithm or any other appropriate method.

It is noted that this approach according to an embodiment of the invention, in a wireless network with distributed channel encoding, gives performance similar to that of a turbo-code.

3. Second Embodiment

Figure 5:
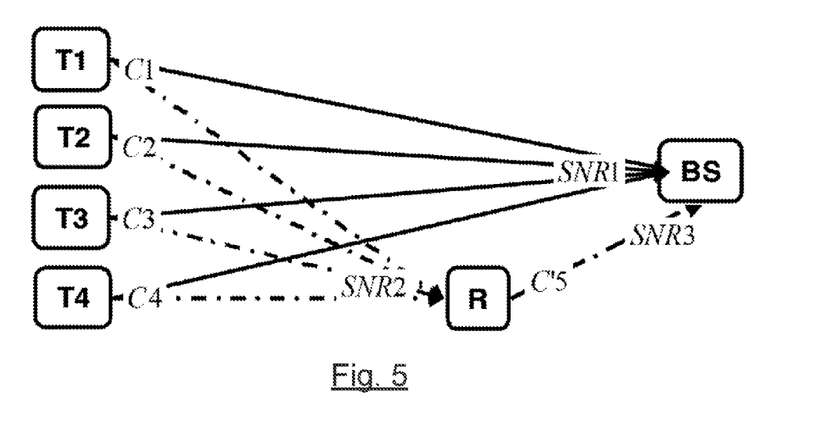
FIG. 5 presents a second example of a system according to an embodiment of the invention with four transmitters, one relay and one receiver.

FIG. 5 illustrates an example of implementation of an embodiment of the invention with four transmitters, one relay and one receiver. FIG. 6A to 6D present the results of simulation obtained for a system of this kind.

We therefore consider the case where four terminals T1, T2, T3 and T4 are sending to a base station BS (receiver as understood in the claims) using a relay R. The terminals send code words of a BCH code (64, 51, 6) and the relay R makes a linear combination of the four received code words C1 to C4, and sends a fifth code word C'5 in the same way as indicated here above.

The base station performs an iterative decoding of the corresponding product code (BCH (64, 51, 6)*parity (5, 4, 2)), which has a minimum distance of 12.

Figure 6A:
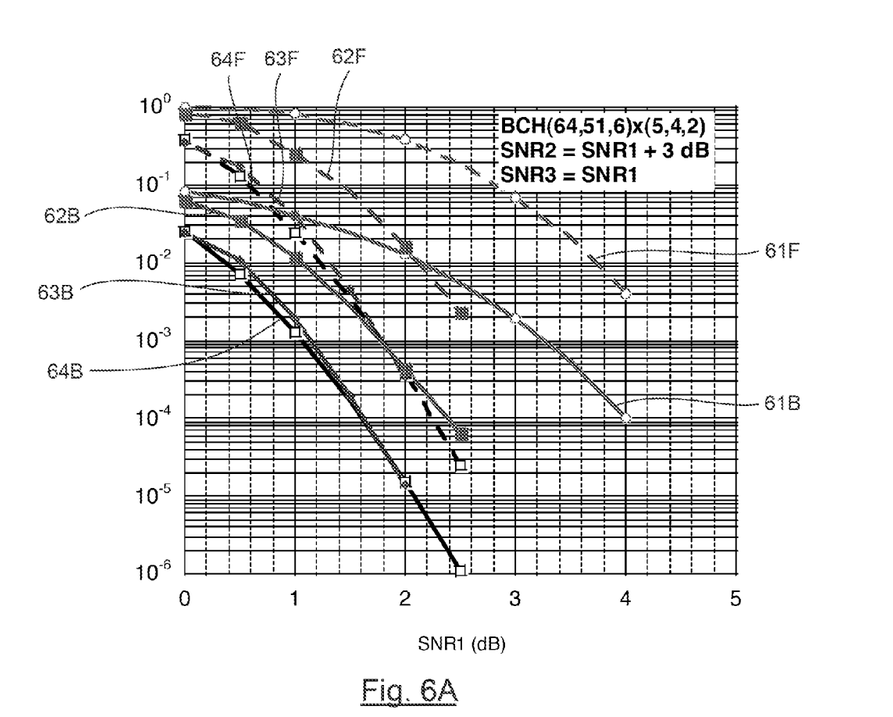
FIGS. 6A to 6D illustrates the performance obtained with the system of FIG. 5.

The signal-to-noise ration SNRi is defined as the energy per bit received (data bit or parity bit) divided by the power spectrum of the single sideband noise. SNR1 corresponds to the link between a terminal and the base station, SNR2 corresponds to the link between a terminal and the relay and SNR3 corresponds to the link between the relay and the base station. For the simulations of FIG. 6A, the following have been fixed:

$$SNR2 = SNR1 + 3 \text{ dB}$$

$$SNR3 = SNR1,$$

which is realistic since the relay is placed between the terminals and the base stations.

FIG. 6A illustrates the BER (bit error rate—index B) and the FER (frame error rate—index F) versus SNR1. Three situations are illustrated corresponding respectively to:
- a relayless decoding, where the base station processes solely the four BCH code words transmitted by the terminals: curves 61B, 61F;

a hard decision decoding with the LLR values in the relay: curves 62B, 62F;

a soft decision decoding on the LLR values in the relay: curves, 63B, 63F.

Naturally, the best results are obtained with this last-named approach. Performance similar to that of a block turbo-decoding type of decoding 64B, 64F is then obtained with a BCH product code (64, 51, 6)*parity (5, 4, 2) in which each terminal would implement a product code, introducing a substantial encoding delay that is not compatible with real-time applications.

Thus, an embodiment of the invention makes it possible to obtain efficient decoding similar to that obtained with a turbo-code without necessitating the implementation of such a turbo-code in the terminals.

It is furthermore possible to simplify the processing in the relay, by using simply hard decisions. The loss in performance remains low, of the order of 0.5 dB for a bit error rate BER of $10^{-5}$.

Figure 6B:
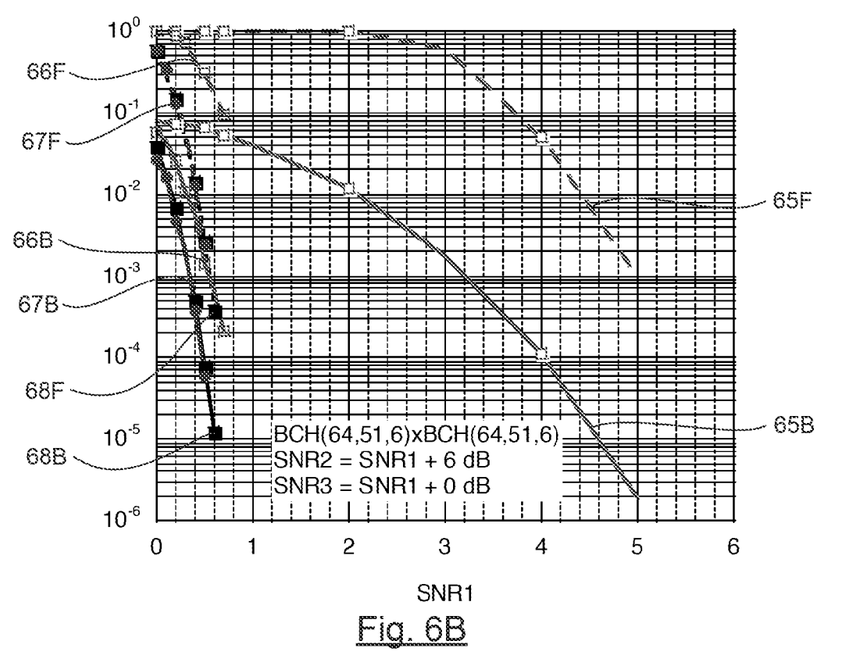

FIG. 6B shows the performance characteristics when the code used by the terminals and the relays is a BCH(64, 51, 6) code, when:

SNR2=SNR1+6 dB

SNR3=SNR1.

The curves respectively present:
a relayless decoding: 65B, 65F;
relay with hard decisions: 66B, 66F;
relay with soft decisions: 67B, 67F;
turbo-decoding for comparison: 68B, 68F.

It can be noted that a gain of more than 4 dB is obtained for a bit error rate BER of $10^{-5}$ and that the difference between the hard decoding and the soft decoding in the relays is low, in the range of 0.2 dB. This is due to the fact that the relay introduces very few errors.

Figure 6C:
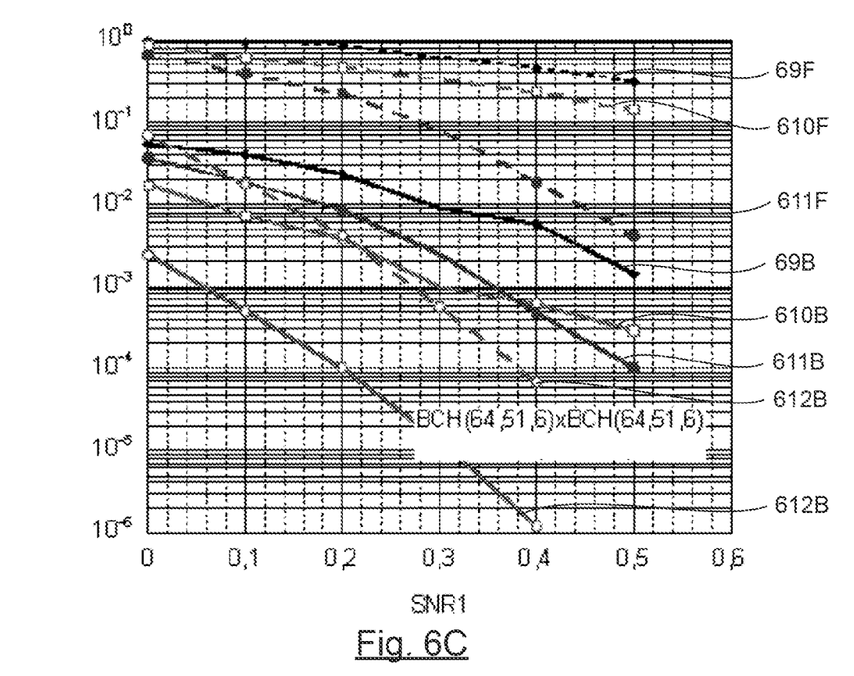

FIG. 6C illustrates the error rate versus SNR1 according to different values of SNR2 and SNR3 in the case of hard decisions. It can be noted that the increase in SNR2 increases performance in the receiver since the errors introduced by the relay are smaller. All the transmitters benefit from the signal-to-noise ratio SNR3 due to an embodiment of the invention.

The curves respectively present the following:
69B, 69F: SNR2=SNR1+6 dB, SNR3=SNR1;
610B, 610F: SNR2=SNR1+6 dB, SNR3=SNR1+3 dB;
611B, 611F: SNR2=SNR1+8 dB, SNR3=SNR1;
612B, 612F: SNR2=SNR1+8 dB, SNR3=SNR1+3 dB.

It will be understood that it is therefore possible, for the base station, to adapt the power of the relay to control the error rate in the base station.

Figure 6D:
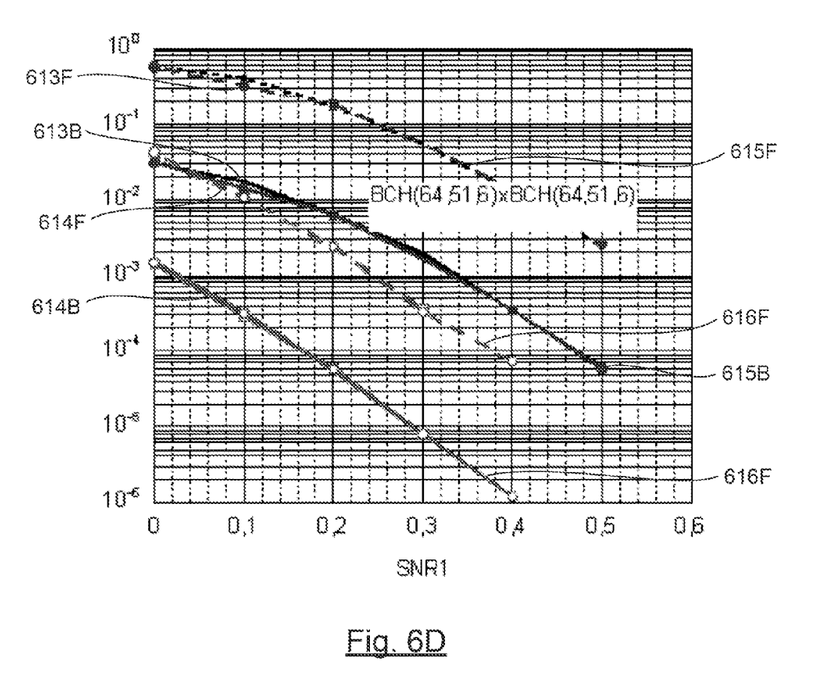

FIG. 6D shows that the gain variation is similar in the case of soft decisions in the relay. However, the performance in the base station appears to be independent of SNR2 because there is no error in the relay once SNR2 is greater than 6 dB.

The curves respectively show:
613B, 613F: SNR2=SNR1+6 dB, SNR3=SNR1;
614B, 614F: SNR2=SNR1+6 dB, SNR3=SNR1+3 dB;
615B, 615F: SNR2=SNR1+8 dB, SNR3=SNR1;
616B, 616F: SNR2=SNR1+8 dB, SNR3=SNR1+3 dB.

4. Distributed Error-Correction Encoding

The approach described here above can of course be generalized to form what is called a distributed error correction encoding or a turbo network encoding.

Each terminal, or more generally each transmitter, can transmit code words, for example of a BCH (n, k, δ) type, in each time, slot, in the case of a TDMA distribution.

The number of terminals can if necessary vary in time, as also the number of code words sent by the different terminals, which may be different according to the terminals. In a given frame formed by n time slots, the terminals use k slots and therefore send k code words.

The relay R receives and estimates these k code words and places the estimations in a k*n matrix. It then encodes the columns of this matrix with a second BCH(n, k, δ) code and transmits the n-k redundancy code words thus formed.

The base station or more generally the receiver receives the k code words with a signal-to-noise ratio SNR1 and the n-k redundancy code words with a signal-to-noise ratio SNR3.

5. Example of an Implementation of Several Relays

Figure 7:
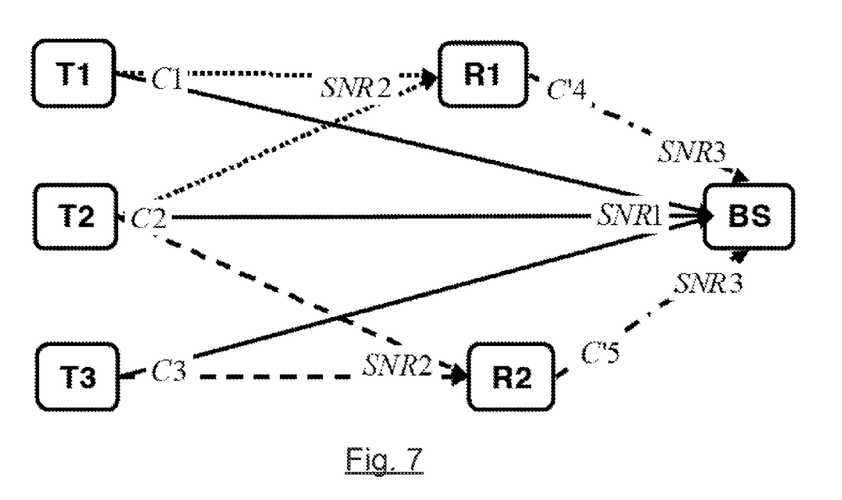
FIG. 7 presents a third example of a system according to an embodiment of the invention with three transmitters, two relays and one receiver.

An embodiment of the invention can be applied of course to the case where several relays are implemented as illustrated in FIG. 7. This embodiment provides for three terminals T1, T2 and T3 and two relays R1 and R2 sending towards a base station (receiver).

Each terminal sends a code word Ci (i=1 to 3). The relay R1 receives C1 and C2, and the relay R2 receives C2 and C3. The relays implement hard decisions, and deliver C'4 and C'5 respectively.

The base station BS therefore receives C1, C2, C3, C'4 and C'5 and carries out an iterative decoding of the product code formed by the code words BCH(n, k, δ) according to the rows and block codes (5, 3) defined by the parity equations:

$C4=C1 \oplus C2$ $C5=C2 \oplus C3$

Figure 8:
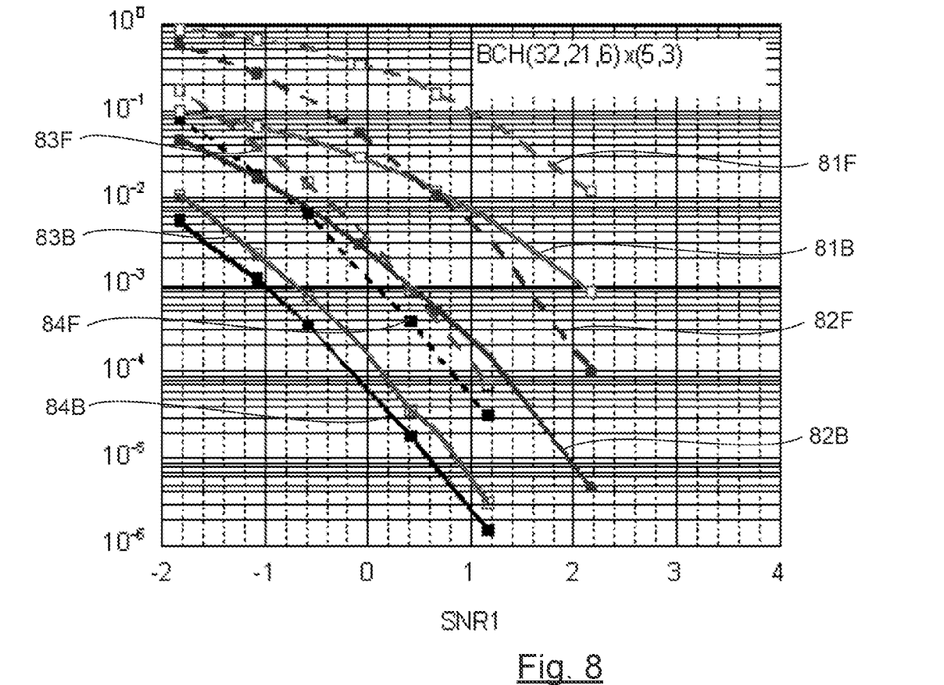
FIG. 8 illustrates the error rate versus a signal-to-noise ratio obtained with the system of FIG. 7, with different types of encoding.

This code has a minimum distance of 2 and is constituted by 8 code words. The soft input and soft output decoding is therefore very easy to implement. FIG. 8 illustrates the error rate as a function of the signal-to-noise ratio SNR2 in the case of code words transmitted by the terminals BCH(32, 21, 6), when SNR3=SNR1.

The curves respectively present:
a relayless decoding: 81B, 81F;
a decoding according to an embodiment of the invention with SNR2=SNR1+3 dB and SNR3=SNR1: 82B, 82F;
a decoding according to an embodiment of the invention with SNR2=SNR1+6 dB and SNR3=SNR1: 83B, 83F;
turbo-decoding, for comparison: 84B, 84F.

When SNR2=SNR1+6 dB, the performance is similar to that of turbo-decoding.

6. "Ad hoc" Local Networks

Figure 9:
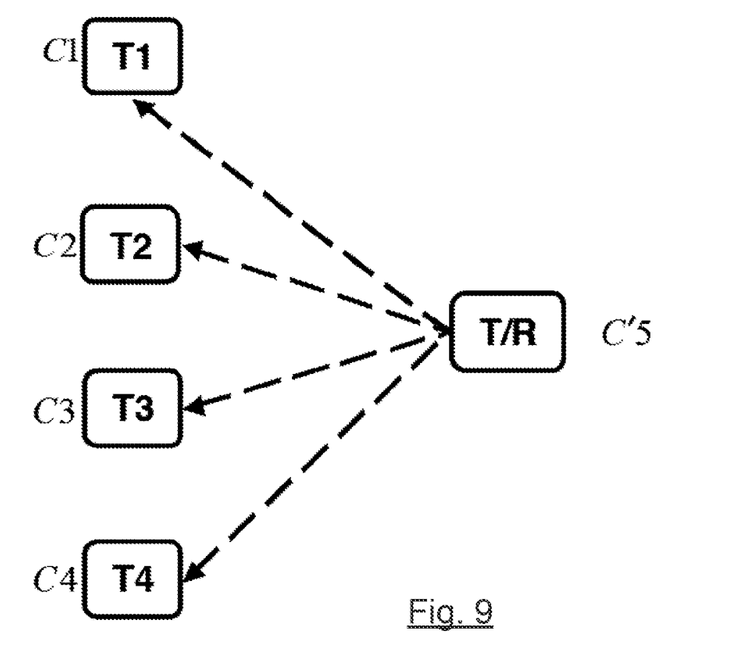
FIG. 9 shows a fourth example of a system according to an embodiment of the invention in an ad hoc network.

An embodiment of the invention can also be implemented for example in ad hoc local networks as illustrated in FIG. 9. Such a network may be for example an emergency network for which it is sought to improve efficiency and limit transmission delays.

The terminals T1 to T4 and T/R are distributed in a delimited zone. One of the terminals T/R is chosen as the relay (it can also be a dedicated relay). Each terminal T1 to T4 sends a code word C1 to C4, which the relay T/R decodes and processes to send the code word C'5, which is a linear combination of the four code words C1 to C4. Each terminal demodulates all the code words except for the one that it has sent itself and carries out a turbo-decoding of the matrix formed by the five code words.

7. Use of Two Thresholds

Instead of using only one threshold in the relay, it is possible to use two thresholds +S and −S in the relay. In this case, the processing can be improved by considering the value of LLR to be discounted if it is below the absolute value of S. If it is above, a hard decision is taken.

According to a first approach, it can be planned that the relay will transmit, through a signaling channel, information identifying the bits of the code words that are not significant. If a bit participating in a parity equation is associated with a reliability below S, then this parity bit is declared to be non-reliable.

According to a second approach, the relay transmits the data by means of three states {−1, 0, 1}. This last-named approach has the advantage of not requiring additional bandwidth or special signaling and of reducing the mean energy per information bit. By contrast, it entails the assumption that there will be minor adaptations in the transmitters and the receivers to take account of these three states.

8. Generalization and Variants

An embodiment of the invention represents a major break with the prior art. Through the introduction of an operation of encoding in a relay, it makes it possible to provide all the dispersed transmitters with the benefit of the encoding gain of a turbo-code. It opens numerous prospects:

- it is possible to use different types of codes in the transmitters provided that they are linear (convolutive, BCH, RS, turbo-codes, LDPC, etc);
- at the relay, the parity code used to encode the columns can be replaced by any linear code (convolutive, BCH, RS, turbo-codes, LDPC, etc);
- at the relay, three options can be envisaged: encoding with or without error correction at reception or also encoding without correction at the level of the relay with transmission of signaling bit to indicate the position of the low-reliability parity bits;
- several encoding layers can be envisaged.

Although the embodiments described rely on a row/column interleaving, other types of interleaving (for example of the type used for turbo-encoding) can be used in the terminals.

The relays can transmit all or part of the redundancy information (and for example only the redundancy associated with the columns of information bits).

An embodiment of the invention can of course be extended to product codes with three dimensions or more.

Although the present disclosure has been described with reference to one or more examples, workers skilled in the art will recognize that changes may be made in form and detail without departing from the scope of the disclosure and/or the appended claims.

The invention claimed is:

1. A method for transmitting a digital signal between at least two transmitters and at least one receiver, implementing a concatenation of at least two codes, wherein the method comprises:
   encoding, in said transmitters, delivering at least two first code words;
   sending said at least two first code words;
   receiving, in at least one relay, at least two of said first code words, called intermediate code words;
   interleaving at least one part of bits of said intermediate code words delivering interleaved bits;
   encoding said interleaved bits, in said at least one relay, delivering at least one second code word taking account of said intermediate code words; and
   sending said at least one second code word by said at least one relay,
   so as to make it possible, in said at least one receiver, to carry out an iterative decoding taking account of said first code words and then a redundancy formed by said at least one second code word.

2. The method according to claim 1, wherein interleaving implements a pseudo-random interleaving.

3. The method according to claim 1, wherein interleaving implements a row/column matrix of a product code.

4. The method according to claim 3, wherein said first code words may include row information bits and row redundancy bits and said second code words form redundancy code words from column redundancy bits, enabling building of a product code matrix in said at least one receiver.

5. The method according to claim 1, wherein sending said at least two first code words and sending said at least one second code word implement at least one of a time division multiple access (TDMA) technique, a frequency division multiple access (FDMA) technique or a code division multiple access (CDMA) technique.

6. The method according to claim 1, wherein receiving the at least two of said first code words comprises implementing a hard decision on a value of each of the bits received in the relay to form said intermediate code words.

7. The method according to claim 1, wherein receiving the at least two of said first code words comprises thresholding a value of each of the bits received in said relay, delivering thresholded data, and correcting errors of said thresholded data to form said intermediate code words.

8. The method according to claim 1, wherein receiving the at least two of said first code words is followed by soft decoding on a soft value of each of the bits received in said relay, to form said intermediate code words.

9. The method according to claim 8, wherein soft decoding implements a search for a code word that minimizes a mean square error versus the soft values received.

10. The method according to claim 1, wherein the method comprises assigning, in said relay, a piece of information on reliability to at least one of said bits of said second code words.

11. The method according to claim 10, wherein said information on reliability comprises at least one signaling bit indicating a position of at least one low-reliability bit in said second code word.

12. The method according to claim 1, wherein at least one of encoding to deliver at least two first code words or encoding said interleaved bits implements a linear code belonging to the group comprising:
   convolutive codes;
   BCH codes;
   RS codes;
   turbo-codes;
   binary or non-binary LDPC codes;
   parity codes.

13. The method according to claim 1, wherein at least one first relay receives at least one intermediate code word sent by a second relay.

14. A non-transient computer-readable carrier comprising a computer program product executable by a processor, wherein the product comprises program code instructions for implementing a method for transmitting a digital signal between at least two transmitters and at least one receiver, implementing a concatenation of at least two codes, wherein the method comprises:
   encoding, in said transmitters, delivering at least two first code words;
   sending said at least two first code words;

receiving, in at least one relay, at least two of said first code words, called intermediate code words;

interleaving at least one part of bits of said intermediate code words delivering interleaved bits;

encoding said interleaved bits, in said at least one relay, delivering at least one second code word taking account of said intermediate code words; and sending said at least one second code word by said at least one relay, so as to make it possible, in said at least one receiver, to carry out an iterative decoding taking account of said first code words and then a redundancy formed by said at least one second code word.

15. A relay device comprising:

means for receiving at least two first code words, called intermediate code words sent out by at least two transmitter devices and/or at least one other relay device;

means for interleaving at least one part of bits of said intermediate code words delivering interleaved bits;

means for encoding said interleaved bits so as to form at least one second code word taking account of said intermediate code words;

means for sending said second code word or code words, so as to make it possible, in at least one receiver, to carry out an iterative decoding taking account of said first code words and then a redundancy formed by said at least one second code word.

* * * * *

UNITED STATES PATENT AND TRADEMARK OFFICE
CERTIFICATE OF CORRECTION

PATENT NO. : 8,510,640 B2  Page 1 of 1
APPLICATION NO. : 12/935184
DATED : August 13, 2013
INVENTOR(S) : Pyndiah et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 349 days.

Signed and Sealed this
Fifteenth Day of September, 2015

Michelle K. Lee
*Director of the United States Patent and Trademark Office*